US011726857B2

United States Patent
Zhang et al.

(10) Patent No.: US 11,726,857 B2
(45) Date of Patent: Aug. 15, 2023

(54) HARDWARE-BASED FAULT SCANNER TO DETECT FAULTS IN HOMOGENEOUS PROCESSING UNITS

(71) Applicant: NVIDIA Corporation, Santa Clara, CA (US)

(72) Inventors: Yilin Zhang, Shanghai (CN); Shangang Zhang, Shanghai (CN); Yan Zhou, Shanghai (CN); Qifei Fan, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 61 days.

(21) Appl. No.: 17/374,592

(22) Filed: Jul. 13, 2021

(65) Prior Publication Data
US 2022/0374298 A1 Nov. 24, 2022

Related U.S. Application Data

(63) Continuation of application No. PCT/CN2021/094437, filed on May 18, 2021.

(51) Int. Cl.
*G06F 11/07* (2006.01)
*G06F 7/544* (2006.01)
*G06N 3/065* (2023.01)

(52) U.S. Cl.
CPC .......... *G06F 11/079* (2013.01); *G06F 7/5443* (2013.01); *G06F 11/0724* (2013.01); *G06F 11/0751* (2013.01); *G06N 3/065* (2023.01)

(58) Field of Classification Search
CPC .............. G06F 11/079; G06F 11/0724; G06F 11/0751; G06F 7/5443
See application file for complete search history.

(56) References Cited

U.S. PATENT DOCUMENTS

| | | | |
|---|---|---|---|
| 5,168,499 A | 12/1992 | Peterson | |
| 11,455,222 B2 * | 9/2022 | Liu | ........................ G06F 11/267 |
| 2018/0218778 A1 | 8/2018 | Chakraborty | |
| 2020/0233759 A1 | 7/2020 | Yoon | |
| 2021/0165730 A1 * | 6/2021 | Surya | .................. G06F 11/0772 |
| 2022/0114431 A1 * | 4/2022 | Lee | ....................... G06N 3/0454 |

FOREIGN PATENT DOCUMENTS

| | | | |
|---|---|---|---|
| CN | 110235202 A | 9/2019 | |
| CN | 111462808 A | 7/2020 | |

OTHER PUBLICATIONS

International Search Report and Written Opinion dated Feb. 15, 2022, on application No. PCT/CN2021/094437.

* cited by examiner

*Primary Examiner* — Nadeem Iqbal
(74) *Attorney, Agent, or Firm* — Lowenstein Sandler LLP

(57) ABSTRACT

Apparatuses, systems, and techniques to detect faults in processing pipelines are described. One accelerator circuit includes a fixed-function circuit that performs an operation corresponding to a layer of a neural network. The fixed-function circuit includes a set of homogeneous processing units and a fault scanner circuit. The fault scanner circuit includes an additional homogeneous processing unit to scan each processing unit of the set for functional faults in a sequence.

20 Claims, 6 Drawing Sheets

HARDWARE-BASED FAULT SCANNER TO DETECT FAULTS IN HOMOGENEOUS PROCESSING UNITS

TECHNICAL FIELD

At least one embodiment pertains to processing resources used to perform and facilitate artificial intelligence. For example, at least one embodiment pertains to hardware-based fault scanners to detect faults in processing pipelines.

BACKGROUND

In many instances, the majority of computing effort for deep learning inference is based on mathematical operations that can generally be grouped into four parts: convolutions, activations, pooling, and normalization. These operations share a few characteristics that make them particularly well suited for hardware implementations: their memory access patterns are predictable and readily parallelized, such as in parallel processing pipelines. Functional safety is the absence of unreasonable risk due to faults caused by a processing unit's malfunctioning behavior during runtime. Functional safety aims to reduce the risk of harm from an unacceptable level to a tolerable level. One prior approach uses error correction coding (ECC) to detect faults in memories. This approach is limited to detecting errors in data but does not differentiate between permanent and temporary faults in the underlying logic. Another approach to detecting faults uses a soft diagnostic library to perform pre-deterministic workloads periodically, and then compare the results against a known reference (also referred to as a golden reference). This approach only compares interface data, and the internal data might have higher precision than the interface data. This approach also impacts performance since the underlying resources are tied up while the pre-deterministic workloads are performed. Another approach to detecting faults uses an algorithm-based error detection technique. The algorithm-based error detection technique requires high-precision math, which is expensive in terms of area on silicon. There can be insufficient bits for some comparisons, so a certain error threshold is allowed during comparisons. The error threshold can lead to false negatives. Due to unavoidable rounding errors in different calculation sequences and the error thresholds used during comparison, some faults need thousands of cycles to be detected, and some faults cannot be detected at all.

DETAILED DESCRIPTION

Figure 1:
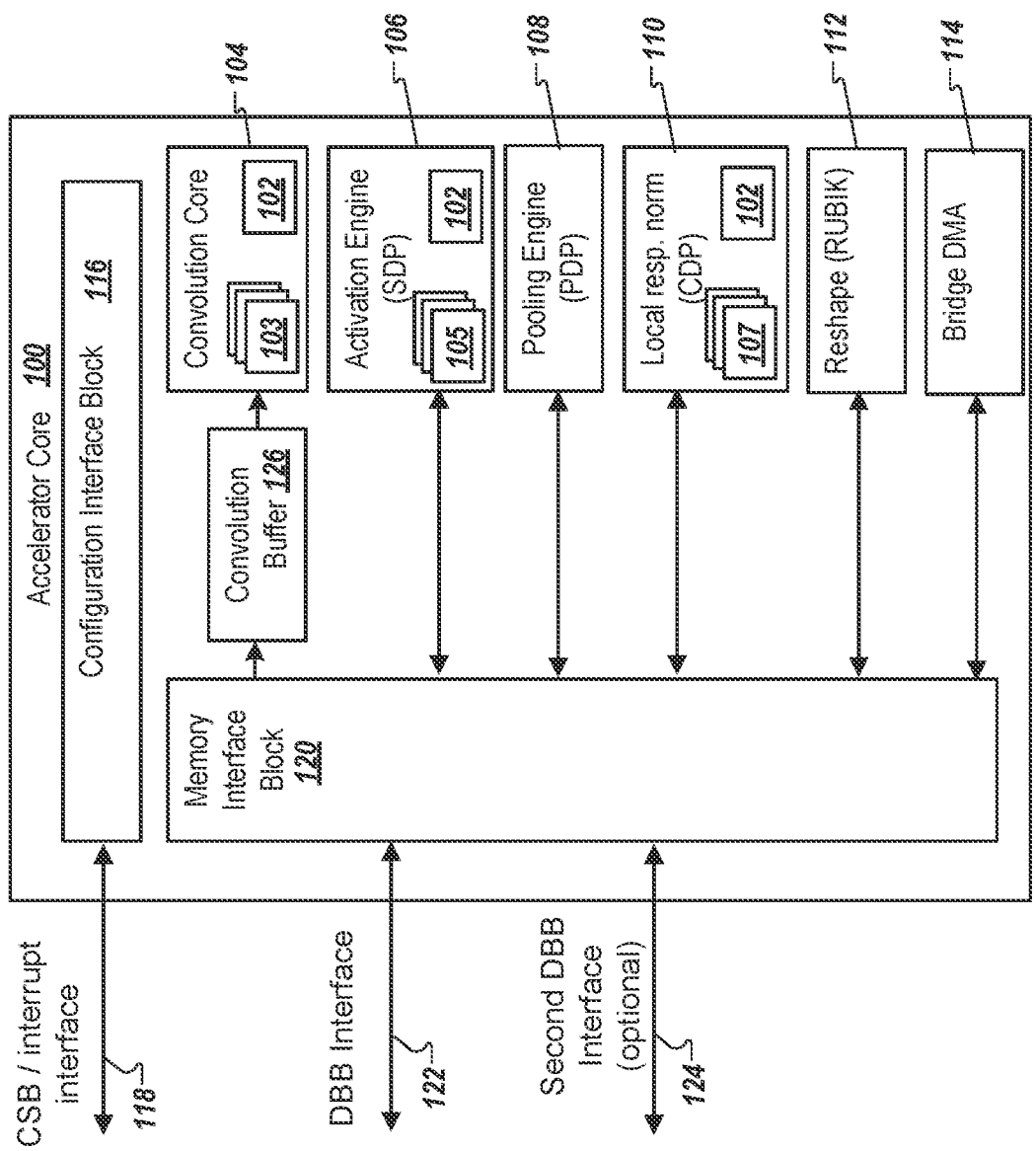
FIG. 1 is a block diagram of an accelerator core with a hardware fault scanner for detecting faults occurring in homogeneous processing units of fixed-function circuits, in accordance with at least some embodiments.

As described above, deep learning inference is based on operations that are well suited for hardware implementations. Deep Learning Accelerator (DLA) circuits, such as NVIDIA® Deep Learning Accelerator (NVDLA), can be used to address the computational demands of inference by providing building blocks that accelerate core deep learning operations. A deep learning accelerator can be used to accelerate different neural networks, such as convolutional neural networks (CNNs), recurrent neural networks (RNN), fully connected neural networks, and so on. These neural networks may have very different structures, may not follow any pre-defined network structure, and new neural networks are being introduced regularly.

Currently, DLA circuits use fixed-function engines (also referred to herein as fixed-function units or fixed-function circuits) for different types of layers in these neural networks, such as fixed-function engines for convolutions, activation functions, pooling, batch normalization, or the like. It should be noted that a neural network from an algorithmic perspective can be specified with one set of layers (referred to herein as "original layers") such as bias and batch normalization. Those original layers can be compiled or transformed into another set of layers (referred to herein as "hardware layers"). Each hardware layer is used as a basic element for scheduling to be executed on an accelerator circuit. The mapping between original layers and hardware layers can be m:n, where m is the number of original layers and n is the number of hardware layers. For example, original layers bias, batch normalization, and local response normalization (LRN) (e.g., a rectified linear unit (ReLU)), in a neural network can be compiled into one hardware layer. In that case, the m:n is 3:1. Each hardware layer can be represented by a basic hardware instruction for one of the fixed-function engines to perform an operation, and each layer communicates with another layer by a memory interface. For example, a first layer can be performed by a first-fixed function engine that receives an input tensor, performs an operation on the input tensor to generate an output tensor, and stores the output tensor in system memory, such as dynamic random access memory (DRAM) coupled to the accelerator. A second layer can be performed by a second fixed-function engine that receives the output tensor from the first layer from memory as a second input tensor, performs an operation on the second input tensor to generate a second output tensor, and stores the second output tensor in DRAM. Each communication introduces a tensor read operation and a tensor write operation in the memory interface.

As described above, prior approaches used to detect faults in DLA circuits are insufficient because they only detect faults in memories, compare only interface data, cannot differentiate between permanent and temporary faults, impact the DLA circuits' performance, and are expensive to implement.

Aspects and embodiments of the present disclosure address these and other challenges by providing, for example, a hardware fault scanner to detect faults in the processing pipeline. Aspects and embodiments of the present disclosure can provide a hardware fault scanner (also referred to herein as fault scanner circuit or fault scanner unit) that is an additional processing unit that scans functional faults in a time-multiplexed manner. In a given cycle, a processing unit and the hardware fault scanner can have the same implementation and the same input data, allowing a bit-by-bit comparison of the outputs of the processing unit and the hardware fault scanner. The hardware fault scanner can be used in the fixed-function circuits of a DLA circuit and parallel processing units in a GPU. Aspects and embodiments of the present disclosure do not suffer from performance loss as the fault scanning is performed concurrently with the processing units' operations. Aspects and embodiments of the present disclosure can provide bit-by-bit comparisons, resulting in fewer false negatives than the algorithm-based error detection techniques. Unlike the algorithm-based error detection techniques that require higher precision and more area, aspects and embodiments of the present disclosure can be implemented in smaller areas and can use the same precision and implementation as the processing units.

FIG. 1 is a block diagram of an accelerator core 100 with a hardware fault scanner 102 for detecting faults in fixed-function circuits 104-114, in accordance with at least some embodiments. The accelerator core 100 (also referred to herein as DLA core or accelerator circuit) includes the hardware fault scanner 102 and various fixed-function circuits, such as a convolution engine 104 (also referred herein to as convolution core), an activation engine 106 (also referred herein to as a single data processor (SDP)) that is a single-point look-up engine for activation functions, a pooling engine 108 (also referred to herein as a planar data processor (PDP)) that is a planar averaging engine for pooling, a local response normalization (LRN) engine 110 (also referred to herein as cross-channel data processor (CDP)) that is a specialized unit that applies the LRN function that operates on channel dimensions, as opposed to the spatial dimensions, a data reshape engine 112 (also referred to herein as RUBIK) that performs data format transformation (e.g., splitting or slicing, merging, contraction, reshape-transport), and a bridge direct memory access (DMA) engine 114 that can move data between the system DRAM and the dedicated memory interface. Additional details of the hardware fault scanner 102 are described below. In other embodiments, the accelerator core 100 can include more or fewer engines than set forth in FIG. 1. Each of these engines can be separate and independently configurable. For example, a system that does not need pooling operations can remove the planar averaging engine entirely. For another example, a system that needs additional convolution performance can scale up the convolution core's performance without modifying other units in the accelerator core 100.

As illustrated in FIG. 1, the accelerator core 100 has multiple connections to the rest of a DLA system, including a configuration interface block 116 that includes a configuration space bus (CSB) interface and an interrupt interface. The configuration interface block 116 can be a control channel interface that implements a register file (e.g., configuration registers) and an interrupt interface (labeled as CSB/interrupt interface 118). In at least one embodiment, the CSB interface is a synchronous, low-bandwidth, low-power, 32-bit control bus designed to be used by a CPU (not illustrated in FIG. 1) to access configuration registers in the configuration interface block 116. The interrupt interface can be a 1-bit level-driven interrupt. The interrupt line can be asserted when a task has been completed or when an error occurs. The accelerator core 100 can also include a memory interface block 120 that uses one or more bus interfaces to interface with memory. In at least one embodiment, the memory interface block 120 has a primary memory interface 122 connecting to system memory (not illustrated in FIG. 1). The system memory can include DRAM. The primary memory interface 122 can be shared with the CPU and input/output (I/O) peripherals. In at least one embodiment, the primary memory interface 122 is a data backbone (DBB) interface that connects the accelerator core 100 and other memory subsystems. The DBB interface is a configurable data bus that can specify different address sizes, different data sizes, and issue different sizes of requests. In at least one embodiment, the DBB interface uses an interface protocol, such as AXI (Advanced Extensible Interface) or other similar protocols. In at least one embodiment, the memory interface block 120 has a second memory interface 124 that allows for a connection to higher-bandwidth memory dedicated to the accelerator core 100 or a computer vision subsystem. For example, the second memory interface 124 can be used with an on-chip SRAM to provide higher throughput and lower access latency.

The memory interface block 120 is coupled to each of the fixed-function engines 104-114. A convolution buffer 126 can be used between the memory interface block 120 and the convolution engine 104 to avoid repeated accesses to system memory. The convolution buffer 126 can be an internal RAM reserved for weight and input feature/pixel storage.

During operation of the accelerator core 100, a processing flow begins with a management processor (either a microcontroller or a CPU), coupled to the accelerator core 100, sending a hardware layer configuration and an activate command. If data dependencies do not preclude this, multiple hardware layers can be sent to different engines and activated simultaneously (i.e., if there is another layer whose inputs do not depend on the previous layer's output). In at least one embodiment, every engine can have a double-buffer for its configuration registers that allows a second layer's configuration to begin processing when the active layer has completed. Once a hardware engine finishes its active task, the configuration interface block 116 can interrupt the management processor to report the completion, and the management processor will begin the process again. This kind of command-execute-interrupt flow repeats until inference on the entire network is complete.

Referring back to FIG. 1, one or more of the fixed-function circuits 104-114 include homogenous processing units and one or more hardware fault scanners 102. The homogenous processing units can be parallel processing units used in the respective fixed-function circuits 104-114. As illustrated in FIG. 1, in at least one embodiment, the convolution core 104 includes a set of homogenous processing units 103 (e.g., multiply-accumulate (MAC) cells) and a hardware fault scanner 102 that is an additional homogenous processing unit (e.g., MAC cell) that is similar to the set of homogeneous processing units 103. In at least one embodiment, the activation engine 106 includes a set of homogenous processing units 105 (e.g., homogeneous look-up table (LUT) logic units) and a hardware fault scanner 102 that is an additional homogenous processing unit (e.g., LUT logic unit) that is similar to the set of homogeneous processing units 105. In at least one embodiment, the LRN engine 110 includes a set of homogenous processing units 107 (e.g., homogeneous look-up table (LUT) logic units) and a hardware fault scanner 102 that is an additional homogeneous processing unit (e.g., LUT logic unit) that is similar to the set of homogeneous processing units 107. In other embodiments, a hardware fault scanner 102 can be used in connection with any other types of parallel processing units in the accelerator core 100 for detecting functional faults in those parallel processing units. In at least one embodiment, a hardware fault scanner 102 can be used to detect functional faults in other circuits, such as parallel processing circuits of a GPU. In at least one embodiment, the parallel processing circuit can be a collection of circuits organized in a set of pipelines. The hardware fault scanner 102 can be an additional pipeline that is similar to the set of pipelines.

In at least one embodiment, the accelerator core 100 includes a fixed-function circuit that performs an operation corresponding to a neural network layer. The fixed-function circuit includes a set of homogeneous processing units and the hardware fault scanner 102. The hardware fault scanner 102 includes an additional homogeneous processing unit to scan each processing unit of the set for functional faults in a time-multiplex manner, such as in a sequence. In at least one embodiment, the hardware fault scanner 102 selectively receives inputs and an output of each processing unit of the set of homogeneous processing units (e.g., 103, 105, 107) in a sequence. The sequence can be used to scan each processing unit of the set of homogeneous processing units. The sequence can repeat after each processing unit is scanned. In some cases, the sequence can be repeated based on a number of cycles of an operation, such as a stripe operation. If an entire stripe operation has C cycles, where C is a positive integer, the sequence can be repeated based on C times a number of processing units in the set. Alternatively, the sequence can be repeated based on C times half of the number of processing units. The hardware fault scanner 102 (as the additional homogeneous processing unit) generates a second output based on each processing unit's inputs of the set of homogeneous processing units. The hardware fault scanner 102 detects a fault responsive to a mismatch between the output of a respective one of the set of homogenous processing units and the second output generated based on the inputs of the respective one of the set of homogeneous processing units. Additional details of the hardware fault scanner 102 selecting inputs and outputs in a time-selective manner are described below with respect to FIG. 2.

Figure 2:
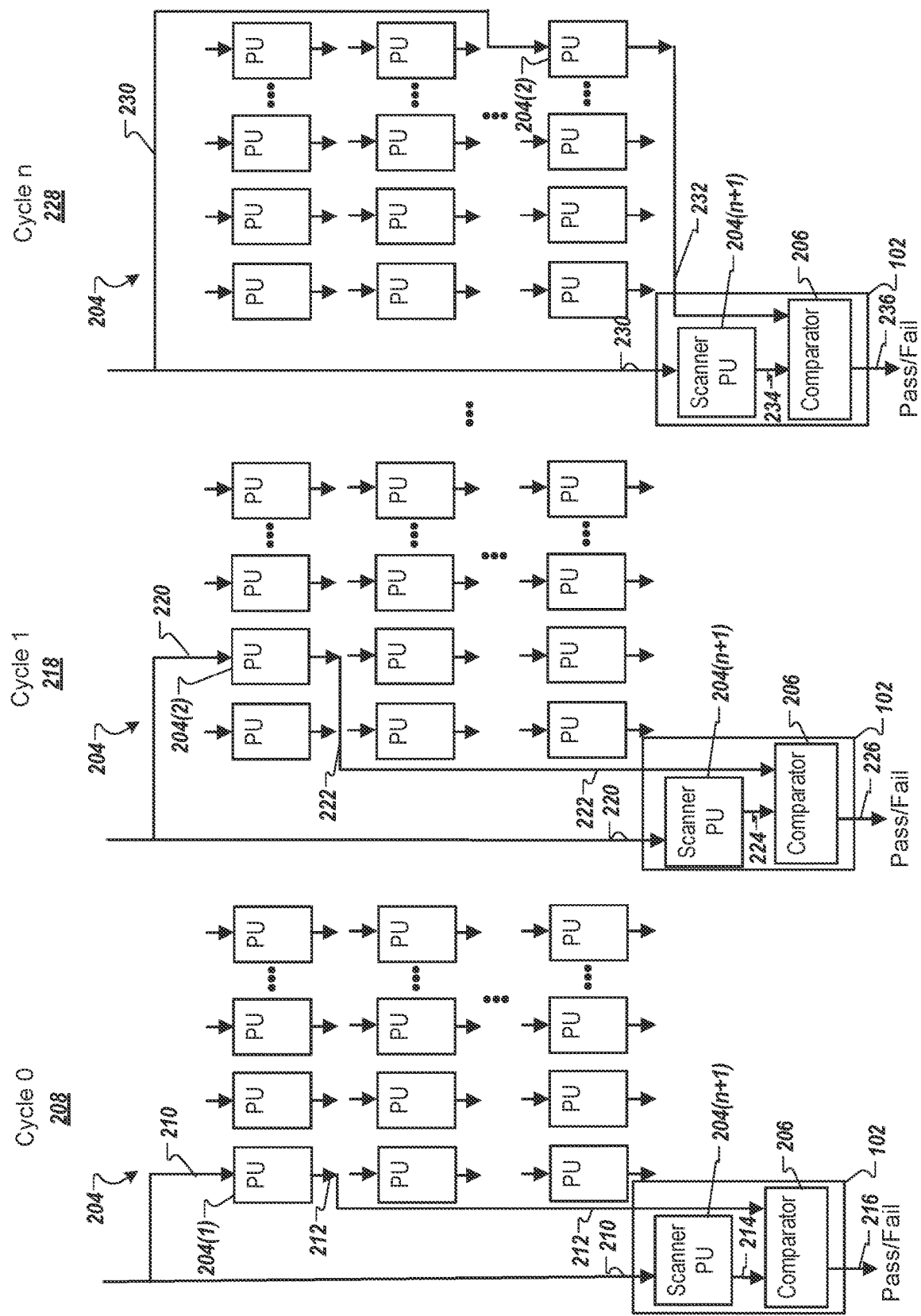
FIG. 2 is a block diagram of a processing pipeline with a set of homogeneous processing units and a hardware fault scanner that operates in a time-multiplexed manner, in accordance with at least some embodiments.

FIG. 2 is a block diagram of a processing pipeline 200 with a set of homogeneous processing units 204 and a hardware fault scanner 102 that operates in a time-multiplexed manner, in accordance with at least some embodiments. The set of homogeneous processing units 204 includes n number of homogeneous processing units 204(1)-(n) (each labeled as "PU"). The hardware fault scanner 102 includes an additional homogeneous processing unit 204(n+1) (labeled as "scanner PU") and a comparator 206 coupled to the additional homogeneous processing unit 204(n+1). The hardware fault scanner 102 also includes a selection circuit (not illustrated in FIG. 2) that selects inputs and outputs of the homogeneous processing units 204(1)-(n) in a time-multiplexed manner over n cycles. The selection circuit selectively receives the different inputs and outputs of each of the homogeneous processing units 204(1)-(n) in each of the n cycles, as illustrated in FIG. 2.

In a first cycle 208, a first processing unit 204(1) receives first inputs 210. The first inputs 210 can include feature data and weight data in the context of neural networks. The first inputs 210 can include other types of data in other processing contexts. For example, the first inputs 210 can include pixel data for image processing applications. The first processing unit 204(1) processes the first inputs 210 and generates a first output 212. The selection circuit causes the first inputs 210 to be received by the additional homogeneous processing unit 204(n+1) and the additional homogeneous processing unit 204(n+1) generates a second output 214. The comparator 206 receives the first output 212 from the first processing unit 204(1) and the second output 214 from the additional homogeneous processing unit 204(n+1). The comparator 206 compares the first output 212 and the second output 214 to detect a fault in the first processing unit 204(1). The comparator 206 detects a fault in the first processing unit 204(1) responsive to a mismatch between the first output 212 and the second output 214. In at least one embodiment, the mismatch occurs when a first value computed by the first processing unit 204(1) is different from a second value computed by the additional homogeneous processing unit 204(n+1). In at least one embodiment, the first value and the second value are integer values. In at least one embodiment, the first value and the second value are floating-point values. Since the processing units are homogeneous and compute the same function, the results are expected to be the same unless there is a fault. The comparator 206 can output a fault signal 216 responsive to a fault detection. In at least one embodiment, the fault signal 216 is output only when the mismatch is detected. In another embodiment, the comparator 206 can output a pass signal, a fail signal, or a single signal that indicates a pass with a first level of the single signal and a fail with a second level of the single signal.

In a second cycle 218, a second processing unit 204(2) receives second inputs 220. The second inputs 220 can include feature data and weight data. In at least one embodiment, the feature data of the second inputs 220 is different from the feature data in the first inputs 210, and the weight data is the same. Alternatively, the feature data may be the same for the first inputs 210 and the second inputs 220, and the weight data can be different. As noted above, the second inputs 220 can include other types of data in other contexts. The second processing unit 204(2) processes the second inputs 220 and generates a third output 222. The selection circuit causes the second inputs 220 to be received by the additional homogeneous processing unit 204(n+1) and the additional homogeneous processing unit 204(n+1) generates a fourth output 224. The comparator 206 receives the third output 222 from the second processing unit 204(2) and the fourth output 224 from the additional homogeneous processing unit 204(n+1). The comparator 206 compares the third output 222 and the fourth output 224 to detect a fault in the second processing unit 204(2). The comparator 206 detects a fault in the second processing unit 204(2) responsive to a mismatch between the third output 222 and the fourth output 224. The comparator 206 can output a fault signal 226 responsive to a fault detection. In at least one embodiment, the fault signal 226 is output only when the mismatch is detected. In another embodiment, the comparator 206 can output a pass signal, a fail signal, or a single signal that indicates a pass with a first level of the single signal and a fail with a second level of the single signal. The process described above with respect to the first and second processing units 204(1)-(2) can be repeated until the nth cycle 228.

In the $n^{th}$ cycle 228, an $n^{th}$ processing unit 204(n) receives $n^{th}$ inputs 230. The $n^{th}$ inputs 230 can include feature data and weight data. Alternatively, the $n^{th}$ inputs 230 can be other types of data. The $n^{th}$ processing unit 204(n) processes the $n^{th}$ inputs 230 and generates a fifth output 232. The selection circuit causes the $n^{th}$ inputs 230 to be received by the additional homogeneous processing unit 204(n+1) and the additional homogeneous processing unit 204(n+1) generates a sixth output 234. The comparator 206 receives the fifth output 232 from the second processing unit 204(2) and the sixth output 234 from the additional homogeneous processing unit 204(n+1). The comparator 206 compares the fifth output 232 and the sixth output 234 to detect a fault in the $n^{th}$ processing unit 204(n). The comparator 206 detects a fault in the $n^{th}$ processing unit 204(n) responsive to a mismatch between the fifth output 232 and the sixth output 234. The comparator 206 can output a fault signal 236 responsive to a fault detection. In at least one embodiment, the fault signal 236 is output only when the mismatch is detected. In another embodiment, the comparator 206 can output a pass signal, a fail signal, or a single signal that indicates a pass with a first level of the single signal and a fail with a second level of the single signal.

In at least one embodiment, the selection circuit's functionality can be integrated into a sequence controller that is responsible for providing the inputs to each of the processing units 204. In at least one embodiment, the selection circuit is part of a convolution sequence controller (CSC), which is responsible for loading input data (e.g., feature data weight data) from the convolution buffer 126 and sending it to the convolution core 104, such as described in more detail below with respect to FIG. 3.

Figure 3:
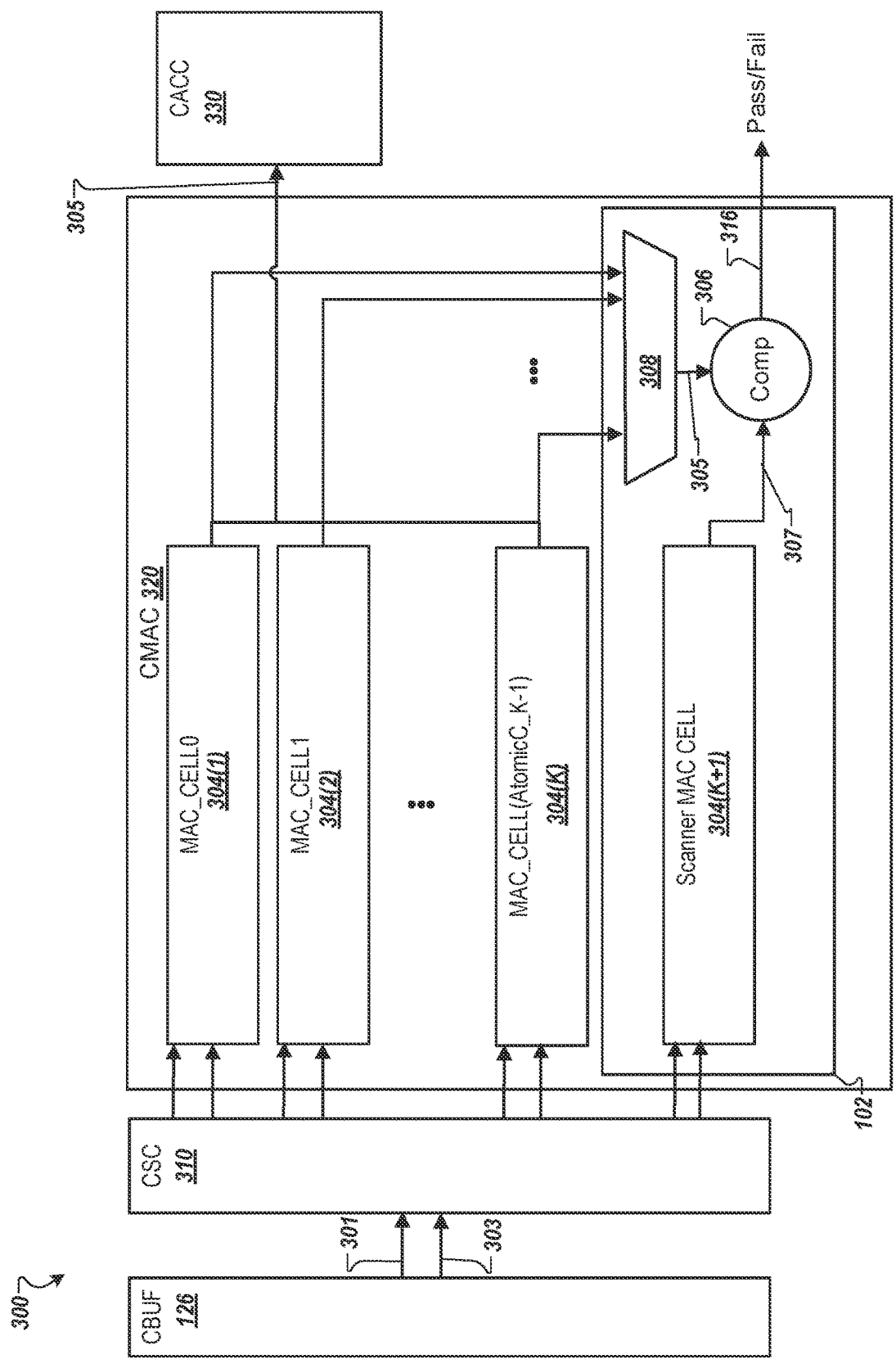
FIG. 3 is a block diagram of a convolution pipeline of a convolution core with a set of homogeneous convolution multiply-accumulate (CMAC) cells and a hardware fault scanner, in accordance with at least some embodiments.

FIG. 3 is a block diagram of a convolution pipeline of a convolution core 300 with a set of homogeneous convolution multiply-accumulate (CMAC) cells 304 and a hardware fault scanner 102, in accordance with at least some embodiments. The convolution pipeline of the convolution core 300 includes multiple stages, including a convolution DMA stage (CDMA) (not illustrated in FIG. 3), a convolution buffer stage (CBUF) (e.g., labeled as 126), a CSC stage 310, a CMAC stage 320 with the set of CMAC cells, and a convolution accumulator stage 330 (CACC).

The CDMA is a pipeline stage that fetches data from memory for the convolution operation and stores it into the convolution buffer 126 in the order needed for the convolution core 300.

The CBUF 126 is a stage in the convolution pipeline and contains a specified amount of memory (e.g., SRAM) that caches input pixel data, input feature data, compressed/uncompressed weight data, or the like from the CDMA. A CSC in the CSC stage 310 can read the input data from the convolution buffer 126. The convolution buffer 126 can include multiple banks that can operate as logical circular buffers in which new inputs (input data, weight data) have incremental entry address and, if the address reaches a maximum address, it wraps to zero and then starts incrementing again.

The CSC in the CSC stage 310 is responsible for loading input data 301 (e.g., feature data/pixel data) and weight data 303 from the CBUF 126 and sending it to particular CMAC cells 304 in the CMAC stage 320. The CSC can generate a sequence to control the convolution operation, as well as fault detection as described in more detail below. For example, the CSC can generate a pair of sequence packages, including a weight loading package and data loading package, where each package can represent one stripe operation. In at least one embodiment, a stripe operation includes n cycles, where n is a programmable parameter. For each cycle, the CSC can fetch feature data from the CBUF and broadcast it to all MAC cells. For each cycle, the CSC can fetch weight data and send it to a specified MAC cell. Each MAC cell has two weight data buffers: one for active (i.e., keeping unchanged for entire stripe operation) and the other for shadowing (can be updated if CSC sends data to a specific MAC cell). The switch between the shadow and the active weight buffers can happen at an end of the stripe operation suddenly. The CSC can execute the feature/pixel loading sequence to load the input data 301 (feature/pixel data) from the CBUF and send it to the appropriate MAC cells 304. The CSC can execute the weight loading sequence to load weights from the CBUF and send them to the appropriate MAC cells 304.

The CMAC stage 320 is one stage of the convolution pipeline for the convolution operation. The CMAC stage 320 receives input data 301 and weight data 303 from the CSC and performs multiplication and addition, and outputs an output 305 representing the result of the convolution accumulator, CACC 330. In at least one embodiment, when working in a Winograd mode, the CMAC stage 320 also performs post addition on the output to transform the result back to a standard activation format. The CMAC stage 320 includes the K number of homogeneous MAC cells 304. Each MAC cell 304 contains a number of multipliers (e.g., 64 16-bit multipliers for int16/fp16 operations) and a number of adders (e.g., 72 adders for int16/fp16, which are for Winograd post addition). Each multiplier and adder can split into two calculation units for some formats (e.g., int8 format), where the throughput is doubled, and the output 305 is called a partial sum. In at least one embodiment, the pipeline depth is seven cycles. Alternatively, other pipeline depths can be used.

The CACC stage 330 is one stage of the convolution pipeline after CMAC 320. The CACC stage 330 is used to accumulate partial sums from CMAC 320, and round/saturate the result before sending to another fixed-function circuit, such as the activation engine (e.g., SDP). For example, the final result of accumulation in CACC 320 is 48 bits for INT16 and 34 bits for INT8 and the bit width between CACC 320 and SDP is 32. For another example, the result of accumulation in CACC 320 is 32 bits for INT8 and INT16. For precisions INT8 and INT16, there can be a round and saturation operation before sending the result to SDP. The precision of rounding can be configured by a field in a register. The CACC stage 330 can include a buffer that can smooth the peak throughput of the convolution pipeline.

Referring back to the CMAC 320 in the convolution pipeline, there can be a K number of MAC cells 304(1)-(K) (e.g., 32 MAC cells) and an additional MAC cell 304(K+1) for the hardware fault scanner 102. According to a sequence generated by the CSC to control convolution operation, input data 301 (feature/pixel data) are broadcast to all MAC cells every cycle and weight data 303 are kept unchanged over an entire stripe operation (e.g., up to 64 cycles). The stripe operation can be used as the time-multiplex granularity of the hardware fault scanner 102. For example, since the active weight data remains unchanged during a stripe operation, in order to scan all K MAC cells, the hardware fault scanner 102 needs the following granularity: K*stripe_length/num_scanners. The minimal cycles required by a stripe operation is depending on how fast all MAC CELLs can be loaded with "new" weight data, thus: min_stripe_length=K*ATOMIC_C/CSC_WEIGHT_BANDWIDTH. In at least one embodiment, for example with INT8, the parameters are: min_stripe_length=64*64/64=64 while the corresponding scanning interval is: 64*64/1=4096 cycles. So, to reduce the scanning interval, the K, ATOMIC_C can be reduced, the CSC_WEIGHT_BANDWIDTH can be increased, or the scanner numbers can be increased. This can be a trade-off between a desired safety level and an area cost.

For example, to traverse all of the K number of MAC cells 304(1)-(K) for fault scanning, there needs to be the number of cycles, C, in a stripe operation times K, the number of MAC cells divided by the scanner numbers, num_scanners (e.g., fault scanner granularity=(K*C)/num_scanners). For a stripe operation of 64 cycles and 32 MAC cells, 2048 cycles are needed for fault scanning. For a stripe operation of 64 cycles and 16 MAC cells, 1024 cycles are needed for fault scanning. In at least one embodiment, the weight data is unchanged over an entire stripe operation, and, in order to scan all K MAC cells, the sequence is repeated based on a number of cycles of the entire stripe operation times the K number of MAC cells 304(1)-(K). In at least one embodiment, the weight data is unchanged over an entire stripe operation, and the sequence is repeated based on a number of cycles of the entire stripe operation times half the K number of MAC cells 304(1)-(K) divided by the number of scanners, num_scanner.

In at least one embodiment, the additional MAC cell 304(K+1) receives the input data 301 and the weight data 303 for one of the MAC cells 304 in each cycle. A multiplexer 308 receives outputs from the K number of MAC cells 304(1)-(K) and selects an output 305 corresponding to the MAC cells 304 for which it receives the input data 301 and weight data 303. A comparator 306 receives an output 307 from the additional MAC cell 304(K+1) and the output 305 and compares the output 307 and the output 307. The comparator 306 generates a fault signal 316 (e.g., pass/fail) responsive to a mismatch between the output 305 and the output 307. In at least one embodiment, the additional MAC cell 304(K+1) of the hardware fault scanner 102 can have the same precision as the MAC cells 304 since the comparator 306 can perform a bit-by-bit comparison of the output 305 and the output 307. In at least one embodiment, a register can store a value that can be injected into the additional MAC cell 304(K+1) of the hardware fault scanner 102 to test the hardware fault scanner 102. Since the value is injected only into the additional MAC cell 304(K+1) of the hardware fault scanner 102 and not the selected one of the MAC cells 304, the comparator 306 generates the fault signal 316, indicating a fault. This process can be performed to confirm that the additional MAC cell 304(K+1) of the hardware fault scanner 102 is operating correctly.

In at least one embodiment, one or more registers can be used to configure the hardware fault scanner 102. In at least one embodiment, a first register stores a first value (e.g., scanner_enable) that enables or disables the hardware fault scanner 102. In at least one embodiment, a second register stores a second value (e.g., scanner_start) that indicates which of the K number of MAC cells 304(1)-(K) should be the first MAC cell selected. In at least one embodiment, a third register stores a third value (e.g., fault_inject_enable) that indicates whether or not to enable a fault injection into the hardware fault scanner 102 for diagnosing the hardware fault scanner 102.

As described above, the hardware fault scanner 102 includes an additional MAC cell 304(K+1) that is homogeneous with the K number of MAC cells 304(1)-(K) of a convolution core 300. In other embodiments, the hardware fault scanner 102 includes a processing unit that is homogeneous with a set of paralleling units in a GPU, a CPU, a processing device, a microcontroller, a controller, or the like. In other embodiments, the hardware fault scanner 102 includes a set of processing units homogeneous with a corresponding set of processing units. For example, an integrated circuit can include a first set of processing units and a second set of processing units. The fault scanner 102 includes a third set of processing units that is homogeneous to the first set of processing units and the second set of processing units so that the hardware fault scanner 102 can detect a fault in the first set or the second set of processing units in a similar manner as described above with a single processing unit. In at least one embodiment, the first set of processing units can be organized in a first pipeline, and the second set of processing units can be organized in a second pipeline. The fault scanner 102 includes a third pipeline homogenous to the first pipeline and the second pipeline.

As described herein, the hardware fault scanner 102 can detect both temporary faults and permanent faults. It should be noted that to detect all temporary faults, the number of scanners would be the same as processing units, which is more like a lock-step mechanism. In at least one embodiment, the fault per layer average diagnostic rate of observable faults detected by the hardware fault scanner 102 is increased. The fault scanner 102 does not need pre-deterministic workloads to detect faults and the hardware fault scanner 102 has the same precision as the processing units being scanned. The fault scanner 102 does not affect the performance of the convolution core 300 as the hardware fault scanner 102 operates concurrently during the operation of the convolution core 300.

Figure 4:
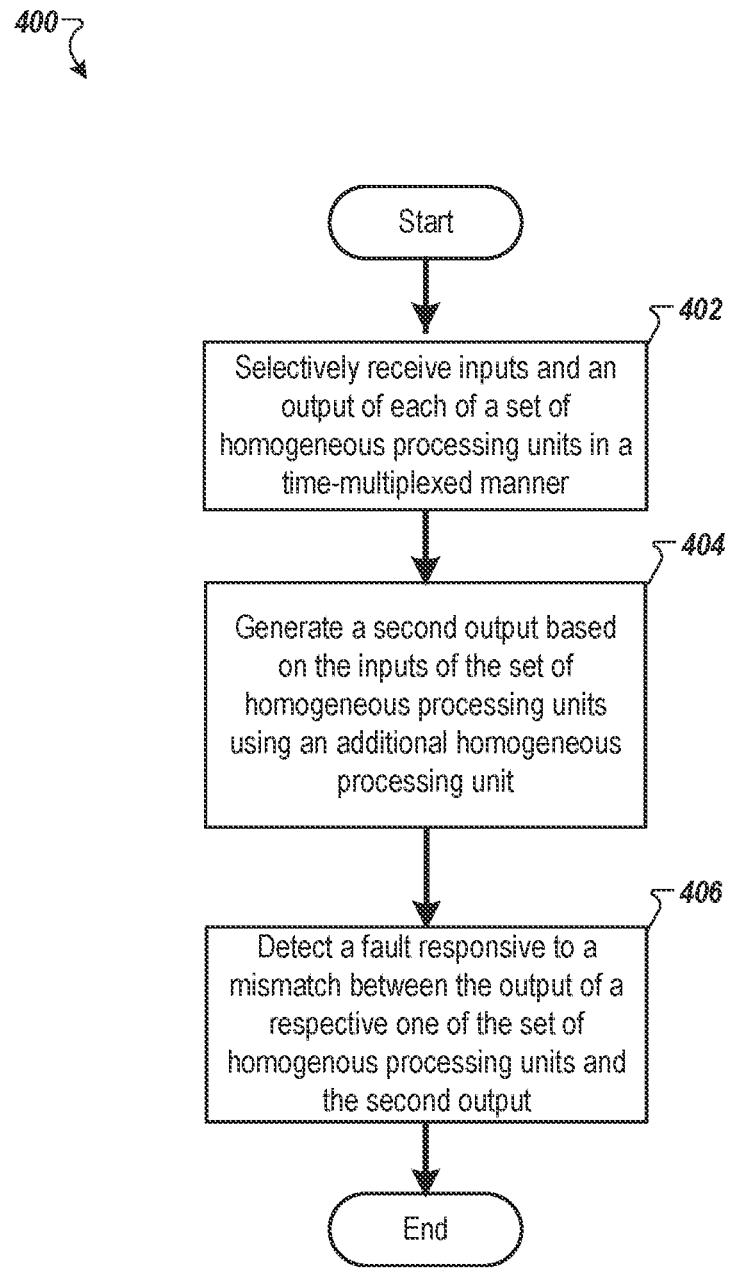
FIG. 4 is a flow diagram of a method for detecting faults in homogeneous processing units of a processing pipeline, in accordance with at least some embodiments.

FIG. 4 is a flow diagram of a method 400 for detecting faults in homogeneous processing units of a processing pipeline, in accordance with at least some embodiments. Method 400 can be performed by processing logic comprising hardware, software, firmware, or any combination thereof. In at least one embodiment, the method 400 is performed by the hardware of accelerator core 100 of FIG. 1. In at least one embodiment, the method 400 is performed by hardware fault scanner 102 of FIG. 1. In at least one embodiment, the method 400 is performed by hardware fault scanner 102 of FIGS. 1-3.

Referring back to FIG. 4, the method 400 begins by processing logic selectively receiving inputs and an output of each of a set of homogeneous processing units in a time-multiplex manner (block 402). The processing logic generates a second output based on each of the set's inputs using an additional homogeneous processing unit (block 404). The processing logic detects a fault responsive to a mismatch between the output of a respective one of the set of homogenous processing units and the second output generated based on the inputs of the respective one of the set of homogeneous processing units (block 406); and the method 400 ends.

In at least one embodiment, the inputs include feature data and weight data for a convolution operation. In at least one embodiment, the weight data is unchanged over an entire stripe operation. In at least one embodiment, the sequence is repeated based on a number of cycles of the entire stripe operation times a number of the homogeneous processing units being scanned. In at least one embodiment, the sequence is repeated based on a number of cycles of the entire stripe operation times half of a number of the homogeneous processing units being scanned. Alternatively, the inputs include other types of data processed by the respective sets of processing units being scanned.

In at least one embodiment, the processing logic receives the first inputs inputted into a first processing unit and a first output from the first processing unit. The first output represents a computation by the first processing unit. The processing logic generates a second output using the same first inputs being input into the additional processing unit and compares the first output and the second output to determine whether there is a match. The processing logic generates and outputs a fault detection signal responsive to a mismatch of the first output and the second output. In at least one embodiment, the processing logic performs a bit-by-bit comparison of the first output and the second output.

In at least one embodiment, the processing logic scans the first processing unit in a first cycle and scans a second processing unit during a subsequent cycle. In the subsequent cycle, the processing logic receives second inputs inputted into the second processing unit and a third output from the second processing unit. The third output represents a computation by the second processing unit. The processing logic generates a fourth output using the same second inputs being input into the additional processing unit and compares the third output and the fourth output to determine whether there is a match. The processing logic generates and outputs a fault detection signal responsive to a mismatch of the third output and the fourth output. In at least one embodiment, the processing logic performs a bit-by-bit comparison of the third and fourth outputs. In at least one embodiment, this process is repeated for n number of cycles, where n is the number of processing units in the set being scanned by the hardware fault scanner 102.

In at least one embodiment, the processing logic scans MAC cells as the processing units using an additional MAC cell. In another embodiment, the processing logic scans LUT logic units using an additional LUT logic unit. In at least one embodiment, when a set of multiple processing units is scanned as a single unit, the processing logic scans the set of processing units using an additional set of processing units that is homogenous to the single unit. In at least one embodiment, when a single unit is a processing pipeline, the processing logic scans a set of homogeneous processing pipelines using an additional homogeneous processing pipeline. In at least one embodiment, the processing logic resides in an accelerator circuit. In at least one embodiment, the processing logic resides in a GPU.

Figure 5:
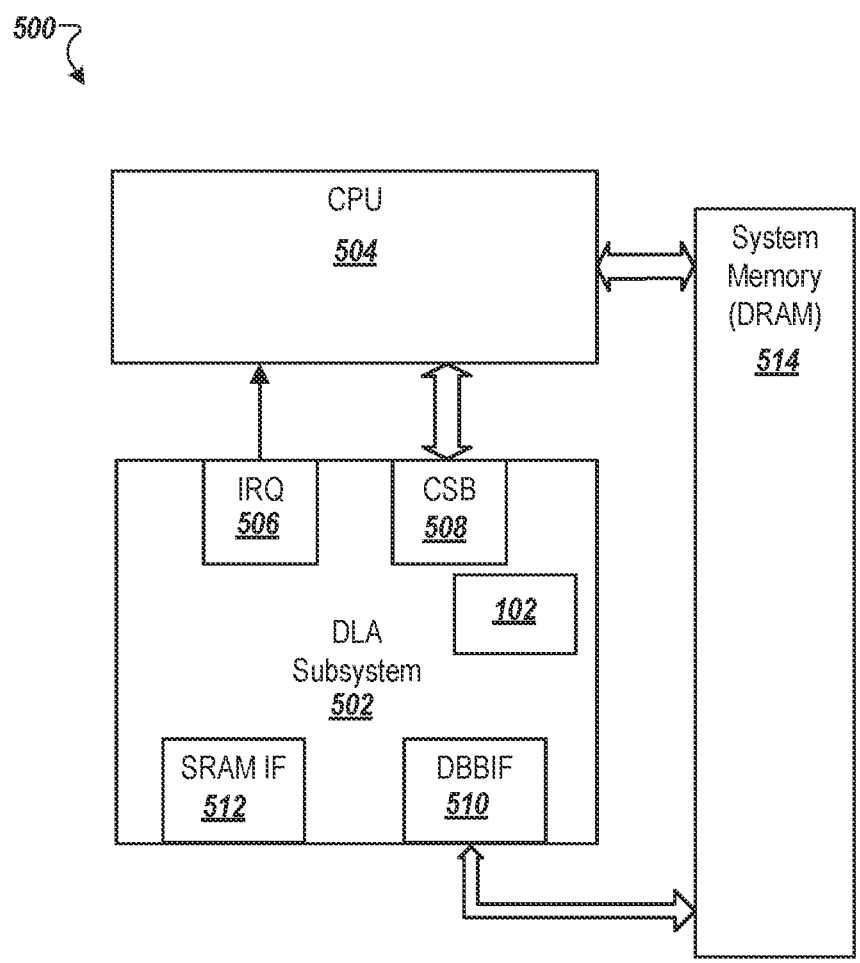
FIG. 5 is a block diagram of a deep learning accelerator (DLA) system, in accordance with at least some embodiments.

FIG. 5 is a block diagram of a DLA system 500, in accordance with at least some embodiments. DLA system 500 is considered a headless system in which unit-by-unit management of a DLA subsystem 502 happens on a main system processor, CPU 504. DLA subsystem 502 includes an interrupt interface 506, a configuration space bus (CSB) interface 508, a primary data bus interface 510 (DBBIF), a secondary data bus interface 512, and the hardware fault scanner 102 described above with respect to FIGS. 1-4. The CPU 504 and the DLA subsystem 502 are coupled to system memory 514 (e.g., DRAM). The DLA subsystem 502 is coupled to the system memory 514 via the primary data bus 510. The DLA subsystem 502 can be coupled to a secondary memory, such as SRAM (not illustrated in FIG. 5). It should be noted that the DLA system 500 may not include the optional secondary memory interface 512 as the system memory 514 can consume less power than an SRAM when overall system performance is less of a priority. The DLA system 500 can be more power-efficient to use the system memory 514 as a computation cache.

DLA system 500 of FIG. 5 represents a more cost-sensitive system than a DLA system with a dedicated controller or coprocessor for unit-by-unit management of the DLA subsystem 502. The DLA system 500 can be considered a small system model. The small system model can be used for cost-sensitive connected Internet of Things (IoT) class devices, artificial intelligence (AI), and automation-oriented systems with well-defined tasks for which cost, area, and power are the primary drivers. Savings in terms of cost, area, and power can be achieved through configurable resources of the DLA subsystem 502. Neural network models can be pre-compiled and their performance can be optimized, allowing larger models to be reduced in the load complexity. In turn, the reduction in load complexity enables a scaled-down DLA implementation where models consume less storage and take less time for system software to load and process. In at least one embodiment, the DLA system 500 can execute one task at a time. Alternatively, the DLA system 500 can execute multiple tasks at a time. For DLA system 500, context switches by DLA 500 do not result in the CPU 504 being overly burdened by servicing a large number of interrupts from the DLA subsystem 502. This removes the need for an additional microcontroller, and the CPU 504 performs memory allocation and other DLA subsystem management operations. As described herein, the DLA subsystem 502 includes a hardware fault scanner 102 for detecting faults in fixed-function engines and other operations by the CPU 504.

Figure 6:
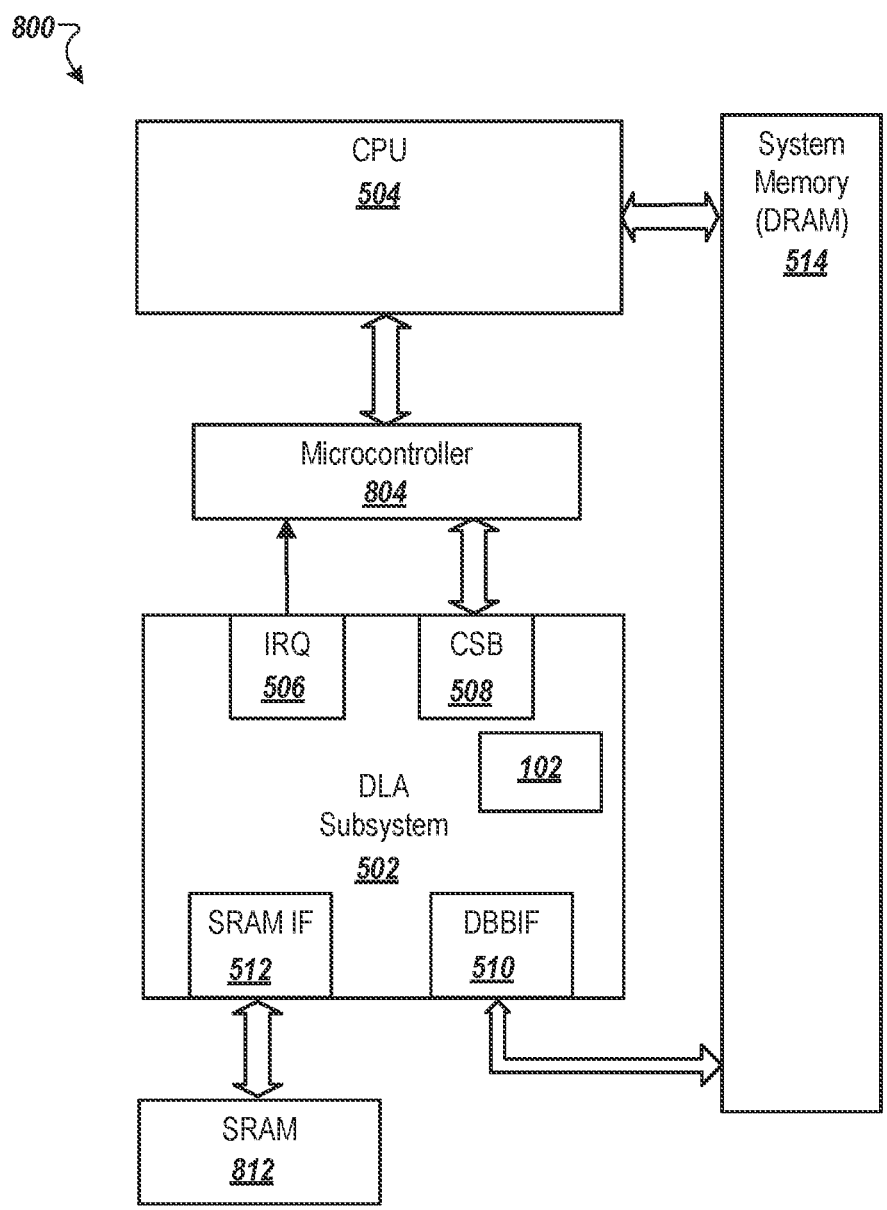
FIG. 6 is a block diagram of a DLA system, in accordance with at least some embodiments.

FIG. 6 is a block diagram of a DLA system 600, in accordance with at least some embodiments. DLA system 600 is considered a headed system in which a main system processor, CPU 602 delegates high-interrupt-frequency tasks to a companion microcontroller 604 coupled to a DLA subsystem 502. DLA system 600 is similar to DLA system 500 as noted by similar reference numbers, except the DLA system 600 includes the companion microcontroller 604. DLA system 600 can be considered a larger system that is characterized by the addition of a dedicated control coprocessor and high-bandwidth SRAM to support the DLA subsystem 600. The larger system model can be used in IoT devices that may run many tasks at once.

In some cases, the larger DLA model in FIG. 6 is used when higher performance and versatility are needed. Performance-oriented IoT systems may perform inference on many different network topologies; thus, they maintain a high degree of flexibility. Additionally, these systems may be performing many tasks at once, rather than serializing inference operations, so inference operations must not consume too much processing power on the CPU 504. To address these needs, the DLA subsystem 502 includes the secondary memory interface 512 that couples to a dedicated high-bandwidth SRAM 612. The SRAM 612 can be used as a cache by the DLA subsystem 502. The SRAM 612 can also be used by other high-performance computer-vision-related components on the system to further reduce traffic to the main system memory 514 (e.g., DRAM). The DLA subsystem 502 enables the interface with the microcontroller 604 (or a dedicated control coprocessor) to limit the interrupt load on the CPU 504. In at least one embodiment, the microcontroller 604 can be a RISC-V-based PicoRV32 processor, an ARM Cortex-M or Cortex-R processors, or other microcontroller designs. Using a dedicated coprocessor (microcontroller 604), the host processor (CPU 504) can handle some tasks associated with managing the DLA subsystem 500. For example, the microcontroller 604 can be responsible for scheduling and fine-grained programming of the DLA hardware, the CPU 504 can still handle some coarse-grained scheduling of the DLA hardware. Also, the host can remain responsible for coarse-grained scheduling on the NVDLA hardware, for input-output memory management (IOMMU) mappings of DLA memory access, as needed, memory allocation of input data and fixed weight arrays on DLA subsystem 500, and synchronization between other system components and tasks that run on the DLA subsystem 502.

In at least one embodiment, DLA subsystem 502 is programmable into multiple modes of operation, such as an independent mode, a fused mode, or the like. Each functional block can be configured in an independent mode for when and what it executes, with each block working on its assigned task (akin to independent layers in a Deep Learning framework). Independent operation can begin and end with the assigned block performing memory-to-memory operations, in and out of main system memory or dedicated SRAM memory. In a fused mode, some blocks can be assembled as a pipeline. Pipelines can improve performance by bypassing the round trip through memory instead of having blocks communicate with each other through small first-in-first-out (FIFO) queues. For example, the convolution core can pass data to the Single Data Point Processor, which can pass data to the Planar Data Processor and the Cross-channel Data Processor).

The techniques disclosed herein may be incorporated in any processor that may be used for processing a neural network, such as, for example, a central processing unit (CPU), a GPU, an intelligence processing unit (IPU), neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range, unless otherwise indicated herein. Each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium store instructions and a main central processing unit ("CPU") executes some of the instructions while a graphics processing unit ("GPU") and/or a data processing unit ("DPU")— potentially in conjunction with a GPU)—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.)

Unless specifically stated otherwise, it may be appreciated that throughout specification terms such as "processing," "computing," "calculating," "determining," or like, refer to action and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An integrated circuit comprising:
a plurality of homogeneous processing units of an accelerator core to perform an operation of a neural network; and
a fault scanner circuit of the accelerator core, the fault scanner circuit comprising an additional homogeneous processing unit to test the plurality of homogenous processing units while the plurality of homogeneous processing units perform the operation of the neural network, wherein the fault scanner circuit is to:
selectively receive inputs and an output of each of the plurality of homogeneous processing units in a sequence;
generate, using the additional homogeneous processing unit, a second output based on the inputs of each of the plurality of homogeneous processing units;
detect a fault responsive to a mismatch between the output of a respective one of the plurality of homogenous processing units and the second output generated based on the inputs of the respective one of the plurality of homogeneous processing units; and
repeat the sequence at least once after all of the plurality of homogeneous processing units are tested.

2. The integrated circuit of claim 1, wherein the fault scanner circuit further comprises:
a comparator coupled to the additional homogeneous processing unit; and
a selection circuit to cause the additional homogeneous processing unit to selectively receive the inputs and the output of each of the plurality of homogeneous processing units in the sequence.

3. The integrated circuit of claim 1, wherein the homogeneous processing units are homogeneous multiply-accumulate (MAC) cells of a convolution core, wherein the additional homogeneous processing unit is an additional homogeneous MAC cell of the convolution core, and wherein the inputs of each of the plurality of homogeneous processing units comprise feature data and weight data.

4. The integrated circuit of claim 3, wherein the weight data is unchanged over an entire stripe operation, and wherein the sequence is repeated based on a number of cycles of the entire stripe operation times a number of the plurality of homogeneous processing units.

5. The integrated circuit of claim 3, wherein the weight data is unchanged over an entire stripe operation, and wherein the sequence is repeated based on a number of cycles of the entire stripe operation times half of a number of the plurality of homogeneous processing units.

6. The integrated circuit of claim 1, wherein the homogeneous processing units are homogeneous look-up table (LUT) logic units of a single data point processor (SDP) or a cross-channel data processor (CDP), wherein the additional homogeneous processing unit is an additional homogeneous LUT logic unit of the SDP or the CDP.

7. The integrated circuit of claim 1, wherein the homogeneous processing units are homogeneous processing pipelines, and wherein the additional homogeneous processing unit is an additional homogeneous processing pipeline.

8. The integrated circuit of claim 1, wherein the integrated circuit is an accelerator circuit.

9. The integrated circuit of claim 1, wherein the integrated circuit is a graphics processing unit (GPU).

10. An accelerator circuit comprising:
a memory interface block; and
a fixed-function circuit, coupled to the memory interface block, to perform an operation corresponding to a layer of a neural network, wherein the fixed-function circuit comprises:
a plurality of homogeneous processing units; and
a fault scanner circuit comprising an additional homogeneous processing unit and a selection circuit, wherein the fault scanner circuit is to scan each of the plurality of homogeneous processing units for functional faults in a sequence, wherein in a first cycle of the sequence:
the selection circuit is to cause the fault scanner circuit to receive a first input and a first output of a first processing unit of the plurality of homogeneous processing units while the plurality of homogeneous processing units perform the operation corresponding to the layer of the neural network;
the additional homogeneous processing unit is to generate a second output based on the first input; and
the fault scanner circuit is to detect a first functional fault responsive to a mismatch between the first output and the second output and
wherein the sequence is repeated at least once after all of the plurality of homogeneous processing units are tested.

11. The accelerator circuit of claim 10, wherein to scan each of the plurality of homogeneous processing units for functional faults in the sequence, the fault scanner circuit is to:
cause the additional homogeneous processing unit to selectively receive inputs and an output of each of the plurality of homogeneous processing units in the sequence;
generate, using the additional homogeneous processing unit, a third output based on the inputs of each of the plurality of homogeneous processing units; and
detect a fault responsive to a mismatch between the output of a respective one of the plurality of homogenous processing units and the third output generated based on the inputs of the respective one of the plurality of homogeneous processing units.

12. The accelerator circuit of claim 10, wherein the fault scanner circuit further comprises:
a comparator coupled to the additional homogeneous processing unit, the comparator to compare the first output and the second output to detect a mismatch; and
the selection circuit to cause the additional homogeneous processing unit to selectively receive inputs and an output of each of the plurality of homogeneous processing units in the sequence.

13. The accelerator circuit of claim 10, wherein the homogeneous processing units are homogeneous multiply-accumulate (MAC) cells of a convolution core, wherein the additional homogeneous processing unit is an additional homogeneous MAC cell of the convolution core, wherein the inputs of each of the plurality of homogeneous processing units comprise feature data and weight data.

14. The accelerator circuit of claim 13, wherein the weight data is unchanged over an entire stripe operation, wherein the sequence is repeated based on a number of cycles of the entire stripe operation times a number of the plurality of homogeneous processing units.

15. The accelerator circuit of claim 13, wherein the weight data is unchanged over an entire stripe operation, wherein the sequence is repeated based on a number of cycles of the entire stripe operation times half of a number of the plurality of homogeneous processing units.

16. The accelerator circuit of claim 10, wherein the homogeneous processing units are homogeneous look-up table (LUT) logic units of a single data point processor (SDP) or a cross-channel data processor (CDP), wherein the additional homogeneous processing unit is an additional homogeneous LUT logic unit of the SDP or the CDP.

17. A method comprising:
   selectively receiving, by a fault scanner circuit of an accelerator circuit, inputs and an output of each of a plurality of homogeneous processing units of the accelerator circuit in a sequence to test the plurality of homogeneous processing units while the plurality of homogeneous processing units perform an operation of a neural network;
   generating, by the fault scanner circuit, a second output based on the inputs of each of the plurality of homogeneous processing units using an additional homogeneous processing unit of the accelerator circuit;
   detecting, by the fault scanner circuit, a fault responsive to a mismatch between the output of a respective one of the plurality of homogenous processing units and the second output generated based on the inputs of the respective one of the plurality of homogeneous processing units; and
   repeating, by the fault scanner circuit, the sequence at least once after all of the plurality of homogeneous processing units are tested.

18. The method of claim 17, wherein the operation is a convolution operation, wherein the inputs of each of the plurality of homogeneous processing units comprise feature data and weight data for the convolution operation.

19. The method of claim 18, wherein the weight data is unchanged over an entire stripe operation, wherein the sequence is repeated based on a number of cycles of the entire stripe operation times a number of the plurality of homogeneous processing units.

20. The method of claim 18, wherein the weight data is unchanged over an entire stripe operation of the convolution operation, wherein the sequence is repeated based on a number of cycles of the entire stripe operation times half of a number of the plurality of homogeneous processing units.

* * * * *